United States Patent
Tam et al.

(10) Patent No.: US 11,374,615 B1
(45) Date of Patent: Jun. 28, 2022

(54) THIRD ORDER INTERMODULATION DISTORTION CANCELLATION

(71) Applicant: NXP USA, Inc., Austin, TX (US)

(72) Inventors: Sai-Wang Tam, Sunnyvale, CA (US); Alden C. Wong, Sunnyvale, CA (US); Weiwei Xu, Cupertino, CA (US); Yui Lin, Palo Alto, CA (US); Jue Yu, Cupertino, CA (US); Sridhar Reddy Narravula, Cupertino, CA (US); Yi-Ling Chao, Sunnyvale, CA (US); Dipen Bakul Parikh, Fremont, CA (US)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 17/205,591

(22) Filed: Mar. 19, 2021

(51) Int. Cl.
| H04B 15/00 | (2006.01) |
| H04B 1/525 | (2015.01) |
| H04B 1/12 | (2006.01) |
| H04B 3/23 | (2006.01) |
| H04B 17/21 | (2015.01) |

(52) U.S. Cl.
CPC .............. *H04B 1/525* (2013.01); *H04B 1/126* (2013.01); *H04B 3/232* (2013.01); *H04B 3/238* (2013.01); *H04B 17/21* (2015.01)

(58) Field of Classification Search
CPC ...... H04B 1/525; H04B 1/0475; H04B 1/711; H04B 1/71075; H04B 3/232; H04B 15/02
See application file for complete search history.

(56) References Cited

U.S. PATENT DOCUMENTS

| 2018/0234162 A1* | 8/2018 | Kim ..................... H04B 17/318 |
| 2018/0316367 A1* | 11/2018 | Johansson ............ H04B 1/0475 |
| 2021/0098897 A1* | 4/2021 | Pehlke ................... H04B 1/525 |

OTHER PUBLICATIONS

A. Raghavan, et al., "Analysis and Design of an Interference Canceller for Collocated Radios," in IEEE Transactions on Microwave Theory and Techniques, vol. 53, No. 11, pp. 3498-3508, Nov. 2005.
A. Katz, et al., "Sensitivity and Mitigation of Reverse IMD in Power Amplifiers," 2011 IEEE Topical Conference on Power Amplifiers for Wireless and Radio Applications, Phoenix, AZ, 2011, pp. 53-56.
S. Ahmed, et al., "Mitigation of Reverse Intermodulation Products at Colocated Base Stations," In IEEE Transactions on Circuits and Systems I: Regular Papers, vol. 60, No. 6, pp. 1608-1620, Jun. 2013.

(Continued)

*Primary Examiner* — Tuan Pham

(57) ABSTRACT

Various embodiments relate to a cancellation circuit configured to generate a cancellation signal, including: an attenuator configured to attenuate a transmitted signal from an aggressor transmitter based upon a first attenuation value; an I/Q demodulator configured to split an attenuated signal into in-phase (I) and quadrature signals (Q); a phase interpolator configured to apply a calibration phase shift and a calibration attenuation to the I signal and Q signal and to recombine the I and Q signals; an auxiliary balun coupled to an output of the phase interpolator; and an auxiliary power amplifier with an input connected to the auxiliary balun configured to generate the cancellation signal, wherein the output of the auxiliary power amplifier is connected to an output of a victim transmitter.

20 Claims, 5 Drawing Sheets

(56) References Cited

OTHER PUBLICATIONS

T. Zhang, et al., "Wideband Dual-Injection Path Self-Interference Cancellation Architecture for Full-Duplex Transceivers," in IEEE Journal of Solid-State Circuits, vol. 53, No. 6, pp. 1563-1576, Jun. 2018.

* cited by examiner

THIRD ORDER INTERMODULATION DISTORTION CANCELLATION

TECHNICAL FIELD

Various exemplary embodiments disclosed herein relate generally third order intermodulation distortion cancellation.

BACKGROUND

When two transmitters are simultaneously transmitting, cross coupling between the two transmitters may lead to third order intermodulation distortion (IMD3). Such modulation may occur when both transmitters are on the same integrated circuit or chip. IMD3 may also occur when both transmitters are on the same board or in close proximity. This cross coupling may occur due to finite coupling between the two transmitter via the antennas, packaging, printed circuit board routing, or on chip routing. Each transmitted signal may be cross coupled into one another at their power amplifier (PA) output. The large PA output and the coupled tone will create a IMD3 tone. At times, these IMD3 tone may be large enough to violate regulations limiting such transmissions. For example, the Federal Communications Commission has set a limit of −41 dBm/MHz for such signals. This problem increases as both transmitters transmit high power signals at the same time.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a cancellation circuit configured to generate a cancellation signal, including: an attenuator configured to attenuate a transmitted signal from an aggressor transmitter based upon a first attenuation value; an I/Q demodulator configured to split an attenuated signal into in-phase (I) and quadrature signals (Q); a phase interpolator configured to apply a calibration phase shift and a calibration attenuation to the I signal and Q signal and to recombine the I and Q signals; an auxiliary balun coupled to an output of the phase interpolator; and an auxiliary power amplifier with an input connected to the auxiliary balun configured to generate the cancellation signal, wherein the output of the auxiliary power amplifier is connected to an output of a victim transmitter.

Various embodiments are described, wherein the phase interpolator interpolates a calibration phase shift value based upon a frequency of the transmitted aggressor signal.

Various embodiments are described, wherein the phase interpolator interpolates a calibration attenuation based upon a frequency of the transmitted aggressor signal.

Various embodiments are described, further comprising routing lines connecting the phase interpolator to the auxiliary balun.

Various embodiments are described, further comprising routing lines connecting the auxiliary balun to the auxiliary power amplifier.

Various embodiments are described, further comprising a controller configured to: scan a phase range and an attenuation range to produce phase value and attenuation value pairs; apply each phase value and attenuation value pair to the phase interpolator; command the aggressor transmitter to transmit a continuous wave (CW) signal; and measure the signal power at the victim transmitter output; determine the phase value and attenuation value pair having the lowest measured signal power, wherein the determined phase value becomes the calibration phase value and the determined attenuation value becomes the calibration attenuation.

Various embodiments are described, further comprising a controller configured to: select an attenuation value; scan a phase range to produce first phase value and attenuation value pairs; apply each first phase value and attenuation value pair to the phase interpolator; command the aggressor transmitter to transmit a continuous wave (CW) signal; measure the signal power at the victim transmitter output; determine the phase value having the lowest measured signal power, scan an attenuation range to produce second phase value and attenuation value pairs using the determined phase value; apply each second phase value and attenuation value pair to the phase interpolator; command the aggressor transmitter to transmit a continuous wave (CW) signal; measure the signal power at the victim transmitter output; and determine the attenuation value having the lowest measured signal power, wherein the determined phase value becomes the calibration phase value and the determined attenuation value becomes the calibration attenuation.

Further various embodiments relate to an integrated circuit, including: a first transceiver including: a first power amplifier; a first antenna interface; and a first balun connected to the first power amplifier and the first antenna interface; a second transceiver comprising: a second power amplifier; a second antenna interface; and a second balun connected to the second power amplifier and the second antenna interface; and a first cancellation circuit including: a first attenuator configured to attenuate a transmitted signal from the first transceiver based upon a first attenuation value; a first I/Q demodulator configured to split a first attenuated signal into first in-phase (I) and first quadrature signals (Q); a first phase interpolator configured to apply a first calibration phase shift and a first calibration attenuation to the first I signal and first Q signal and to recombine the first I and Q signals; a first auxiliary balun coupled to an output of the first phase interpolator; and a first auxiliary power amplifier with an input connected to the first auxiliary balun configured to generate a first cancellation signal, wherein the output of the first auxiliary power amplifier is connected to an output the second transceiver.

Various embodiments are described, further comprising a second cancellation circuit including: a second attenuator configured to attenuate a transmitted signal from the second transceiver based upon a second attenuation value; a second I/Q demodulator configured to split a second attenuated signal into second in-phase (I) and second quadrature signals (Q); a second phase interpolator configured to apply a second calibration phase shift and a second calibration attenuation to the second I signal and second Q signal and to recombine the second I and Q signals; a second auxiliary balun coupled to an output of the second phase interpolator; a second auxiliary power amplifier with an input connected to the second auxiliary balun configured to generate a second cancellation signal, wherein the output of the second auxiliary power amplifier is connected to an output the first transceiver.

Various embodiments are described, wherein the first phase interpolator interpolates a first calibration phase shift value based upon a first frequency of the first transmitted signal.

Various embodiments are described, wherein the first phase interpolator interpolates a first calibration attenuation based upon a first frequency of the first transmitted signal.

Various embodiments are described, further comprising first routing lines connecting the first phase interpolator to the first auxiliary balun.

Various embodiments are described, further comprising first routing lines connecting the first auxiliary balun to the first auxiliary power amplifier.

Various embodiments are described, further comprising a controller configured to: scan a first phase range and a first attenuation range to produce first phase value and attenuation value pairs; apply each first phase value and attenuation value pair to the first phase interpolator; command the first transceiver to transmit a first continuous wave (CW) signal; measure the signal power at the second transceiver output; and determine the first phase value and attenuation value pair having the lowest measured signal power, wherein the determined phase value becomes the first calibration phase value and the determined attenuation value becomes the first calibration attenuation.

Various embodiments are described, further comprising a controller configured to: select a first attenuation value; scan a first phase range to produce first phase value and attenuation value pairs; apply each first phase value and attenuation value pair to the first phase interpolator; command the first transceiver to transmit a continuous wave (CW) signal; measure the signal power at the second transceiver output; determine the phase value having the lowest measured signal power, scan a first attenuation range to produce second phase value and attenuation value pairs using the determined phase value; apply each second phase value and attenuation value pair to the first phase interpolator; command the first transceiver to transmit a continuous wave (CW) signal; and measure the signal power at the second transceiver output; determine the attenuation value having the lowest measured signal power, wherein the determined phase value becomes the first calibration phase value and the determined attenuation value becomes the first calibration attenuation.

Further various embodiments relate to a method to generate a cancellation signal, including: attenuating a transmitted signal from an aggressor transceiver based upon a first attenuation value; splitting an attenuated signal into in-phase (I) and quadrature signals (Q); applying a calibration phase shift and a calibration attenuation to the I signal and Q signal and recombining the I and Q signals; amplifying recombined I and Q signals to generate the cancellation signal; and applying the cancellation signal to an output of a victim transmitter.

Various embodiments are described, further comprising interpolating a calibration phase shift value based upon a frequency of the transmitted aggressor signal.

Various embodiments are described, further comprising interpolating a calibration attenuation based upon a frequency of the transmitted aggressor signal.

Various embodiments are described, further including: scanning a phase range and an attenuation range to produce phase value and attenuation value pairs; applying each phase value and attenuation value pair to the I and Q signals; commanding the aggressor transmitter to transmit a continuous wave (CW) signal; measuring the signal power at the victim transmitter output; and determining the phase value and attenuation value pair having the lowest measured signal power, wherein the determined phase value becomes the calibration phase value and the determined attenuation value becomes the calibration attenuation.

Various embodiments are described, further including: selecting an attenuation value; scanning a phase range to produce first phase value and attenuation value pairs; applying each first phase value and attenuation value pair to I and Q signals; commanding the aggressor transmitter to transmit a continuous wave (CW) signal; measuring the signal power at the victim transmitter output; determining the phase value having the lowest measured signal power, scanning an attenuation range to produce second phase value and attenuation value pairs using the determined phase value; applying each second phase value and attenuation value pair to I and Q signals; commanding the aggressor transmitter to transmit a continuous wave (CW) signal; measuring the signal power at the victim transmitter output; and determining the attenuation value having the lowest measured signal power, wherein the determined phase value becomes the calibration phase value and the determined attenuation value becomes the calibration attenuation.

BRIEF DESCRIPTION OF THE DRAWINGS

In order to better understand various exemplary embodiments, reference is made to the accompanying drawings, wherein:

FIG. 6 is a flow chart illustrating the calibration procedure. Calibration may occur when the device including the IC is powered on.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
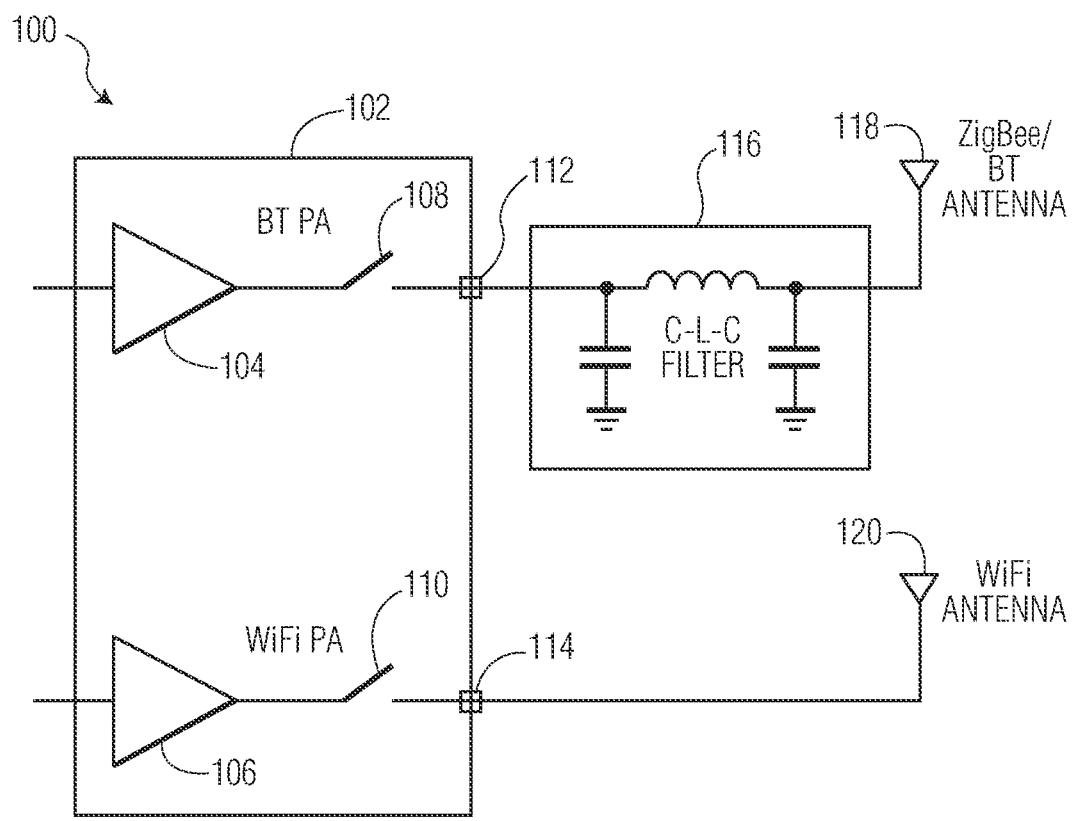
FIG. 1 illustrates a chip or a board having two different transmitters.

FIG. 1 illustrates a chip or a board having two different transmitters. The wireless system 100 includes chip 102, CLC filter 116, BT antenna 118, and Wi-Fi antenna 120. For example, chip 102 may implement a Bluetooth (BT) transceiver and a Wi-Fi transceiver. The BT transceiver may include power amplifier 104 and a BT receiver (not shown). A Wi-Fi transceiver may include power amplifier 106 and Wi-Fi receiver (not shown). The chip 102 may include antenna ports 112 and 114 connected to the output of the BT power amplifiers 102, 104 and Wi-Fi power amplifier 106 respectively. The BT antenna 118 may be connected to antenna port 112 and transmit BT signals output by the power amplifiers 102 and 104. The Wi-Fi antenna 120 may be connected to antenna port 114 and transmit Wi-Fi signals output by the power amplifier 106. The BT antenna 118 may be coupled to the antenna port 112 via the CLC filter 116. Further, switches 108 and 110 may also connected and disconnect the BT antenna 118 and Wi-Fi antenna 120 from the BT transceiver and Wi-Fi transceiver respectively when it is desirable to isolate the antennas from the power amplifiers and receivers. While BT and Wi-Fi transceivers are illustrated in FIG. 1, other types of transceivers implementing other communication protocols may also be considered. Further, the chip 102 including the BT transceiver and the Wi-Fi transceiver is provided as an example of where the embodiments described herein may be applied, but the embodiments described herein may also be applied to circuit boards or other circuit constructions where IMD3 occurs.

Figure 2:
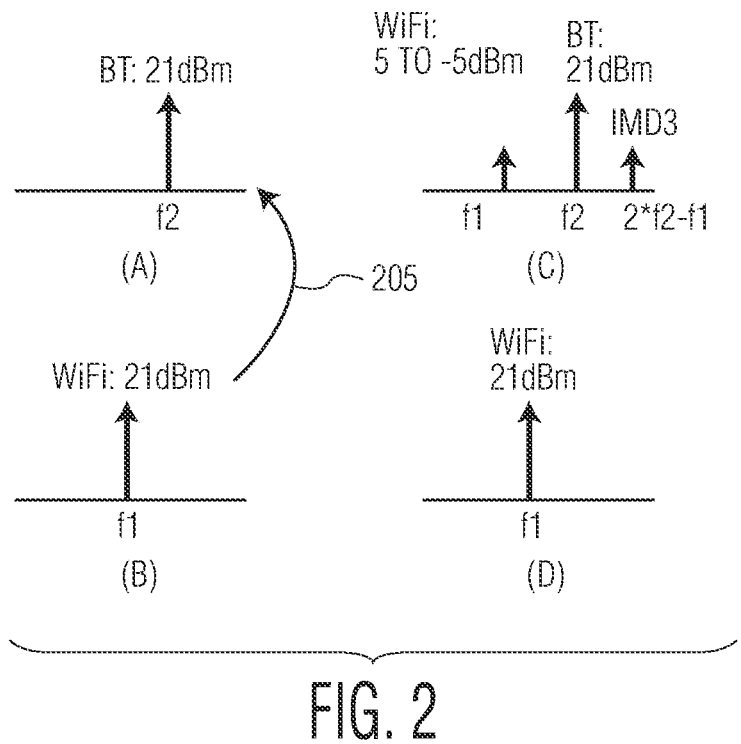
FIG. 2 illustrates frequency plots of the signals transmitted by the power amplifiers.

FIG. 2 illustrates frequency plots of the signals transmitted by the power amplifiers. Plot (A) of FIG. 2 illustrates the transmission of a BT signal at a frequency of f2 having a power of 21 dBm. Plot (B) of FIG. 2 illustrates the transmission of a Wi-Fi signal at a frequency of f1 having a power of 21 dBm. The arrow 205 illustrates coupling of the Wi-Fi signal onto the BT signal. Plot (C) of FIG. 2 illustrates presence of the attenuated Wi-Fi signal at f1 along with the BT signal at f2. The coupled Wi-Fi signal may have a power of −5 to 5 dBm, for example. The BT signal and the coupled Wi-Fi signal may intermodulate to generate an IMD3 signal at 2*f2−f1 due to non-linearities in the BT power amplifier. When the Wi-Fi signal is being transmitted at high power, this IMD3 signal may be large enough to exceed regulatory emission limits (e.g., −41 dBm/MHz specified by the FCC).

Figure 3:
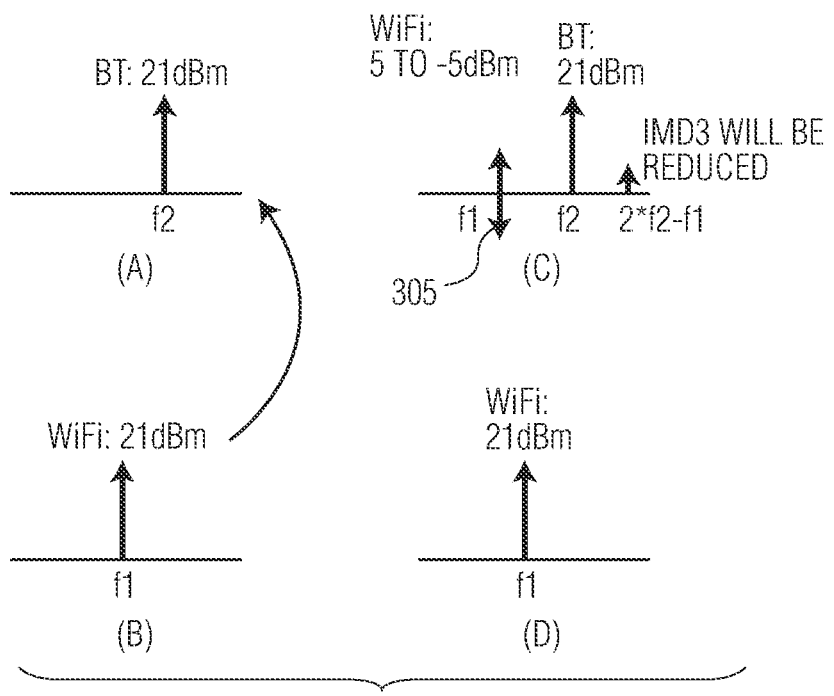
FIG. 3 illustrates the addition of a cancellation signal at the output of the BT power amplifier.

The BT antenna may be connected to the BT power amplifier using a balun transformer in order to provide DC isolation and impedance transformation. While balun transformers are illustrated herein, any type of balun may be used that satisfies the system requirements. One way to decrease the IMD3 signal is to increase the balun transformer primary to secondary turns ratio. This increases the size, cost, power consumption, and space of the transformer balun, so this approach is undesirable. Another approach would be to use a very sharp and tunable narrow band filter to filter out the IMD3 component, but would be very difficult to implement. Another approach would be to generate a cancellation signal with the same magnitude but 180° out of phase with respect to the IMD3 signal. This is very challenging as the dynamic range is very large. Another approach is to generate a cancellation tone that cancels out the coupled Wi-Fi signal present at the output of the BT power amplifier. FIG. 3 illustrates the addition of a cancellation signal at the output of the BT power amplifier. FIG. 3 shows the same 4 plots as FIG. 2, but FIG. 3 also illustrates a cancellation signal 305 in plot (C). The cancellation signal 305 has a magnitude equal to the magnitude of the coupled Wi-Fi signal and a phase difference of 180° from the coupled Wi-Fi signal. This signal seeks to cancel or greatly reduce the coupled Wi-Fi signal present at the output of the BT power amplifier. This results in a reduction of the resulting IMD3 signal at frequency 2*f2−f41. This then results in a an IMD3 signal level that meets and exceeds regulatory requirements.

Figure 4:
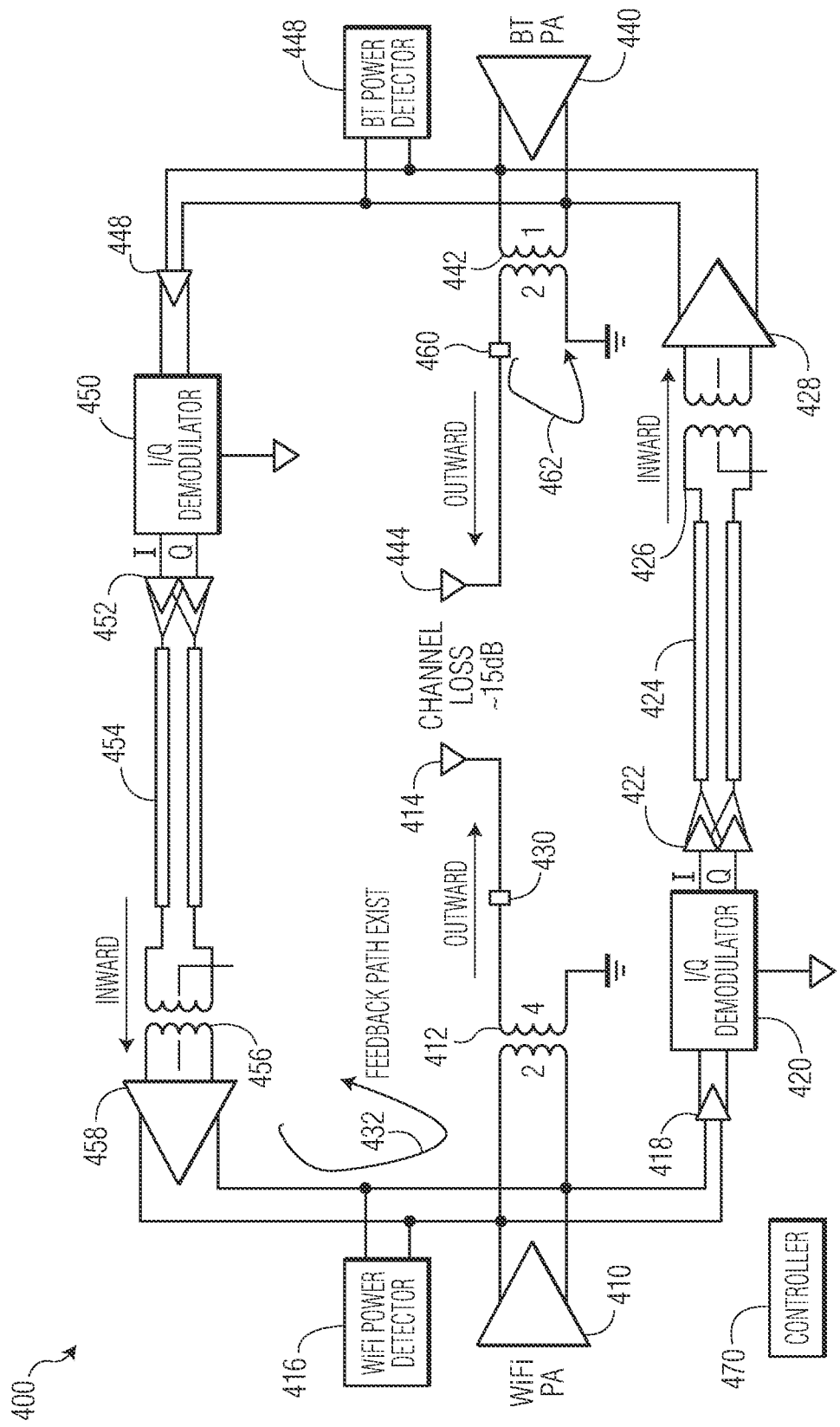
FIG. 4 illustrates a system including a Wi-Fi transceiver and BT transceiver that includes IMD3 cancellation.

FIG. 4 illustrates a system including a Wi-Fi transceiver and BT transceiver that includes IMD3 cancellation. The system 400 includes a Wi-Fi PA 410, a Wi-Fi balun transformer 412, and a Wi-Fi antenna 414. If the system is implemented on a chip, a Wi-Fi pad 430 may provide an interface between the Wi-Fi PA 410 on the chip and the Wi-Fi antenna 414. The system 400 also includes a BT PA 440, a BT balun transformer 442, and a BT antenna 444. If the system is implemented on a chip, a BT pad 460 may provide an interface between the BT PA 440 on the chip and the BT antenna 444. The system also includes a Wi-Fi power detector 416 and a BT power detector 446. The Wi-Fi power detector 416 measures the power at the output of the Wi-Fi PA 410. The BT power detector 446 measures the power at the output of the BT PA 410. These power measurements may be used to produce a cancellation signal that cancels the aggressor coupled signal in the victim system.

For convenience and illustration, an aggressor will be defined as the transceiver causing interference, and a victim will be defined as the transceiver that is receiving a coupled signal from the aggressor that generates an IMD3 signal in the victim transceiver.

To explain how to cancel the aggressor cross coupled signal by the victim, the aggressor will be the BT transceiver and the victim will be the Wi-Fi transceiver. A first cancellation circuit may include an attenuator 448, an I/Q demodulator 450, a phase interpolator 452, routing lines 454, auxiliary balun transformer 456, and an auxiliary amplifier 458. The attenuator 448 is connected to the output of the BT PA 440 and produces an attenuated BT PA signal. The amount of attenuation applied by the attenuator 448 is a coarse attenuation and is based upon amount of coupling loss between the antennas. The coupling loss value may be for example in the range of 15 dB to 25 db.

Next, the I/Q demodulator generates I and Q signals (i e, in-phase and quadrature signals). The phase interpolator attenuates and applies a phase shift to the I and Q signals and recombines the I and Q signals. The phase shift applied to the signal is determined during a calibration phase. The phase values may be determined during calibration for different frequency channels and may be frequency dependent. When a specific transmit frequency is used, values from a look-up table may be used and an interpolated phase value determined and applied. Likewise, the attenuation applied to the signal is determined during a calibration phase. The attenuation values may be determined during calibration for different frequency channels and may be frequency dependent. When a specific transmit frequency is used, values from a look-up table may be used and an interpolated attenuation value determined and applied. Determining the specific calibration values for a specific frequency may be done using a piecewise curve, so some other function that describes the variation of the calibration parameters over frequency.

The output of the phase interpolator 452 may be routed over routing lines 454 to the auxiliary balun transformer 456 that couples the output signal to the auxiliary amplifier 458. The auxiliary balun transformer 456 provides DC isolation between the BT PA 446 and the auxiliary amplifier 458 and Wi-Fi PA 410. The auxiliary amplifier 458 amplifies the received cancellation signal and outputs the cancellation signal on the output lines of the Wi-Fi PA. The auxiliary amplifier 458 is a scaled version of the BT PA 440, so that it is has a similar operating characteristic as the BT PA 440. For example, the auxiliary amplifier 458 may be a ⅛ scale version of the BT PA 440. With proper calibration (further described below), the cancellation signal output by the auxiliary amplifier 458 will cancel the cross coupled BT PA signal found at the Wi-Fi PA 410 and hence reduce or the IMD3 signal.

A second cancellation circuit includes an attenuator 418, an I/Q demodulator 420, a phase interpolator 422, routing lines 424, auxiliary balun transformer 426, and an auxiliary amplifier 428. This second cancellation circuit operates in the same manner as the first cancellation circuit, but instead produces a cancellation signal that cancels a cross coupled Wi-Fi PA signal found at the output of the BT PA 440.

The system 400 also includes a controller 470 that provides the calibration values to the phase interpolators and the attenuators. Further, the controller preforms the calibration procedure that will calibrate the system 400 to cancel the cross coupled power signals.

Figure 5:
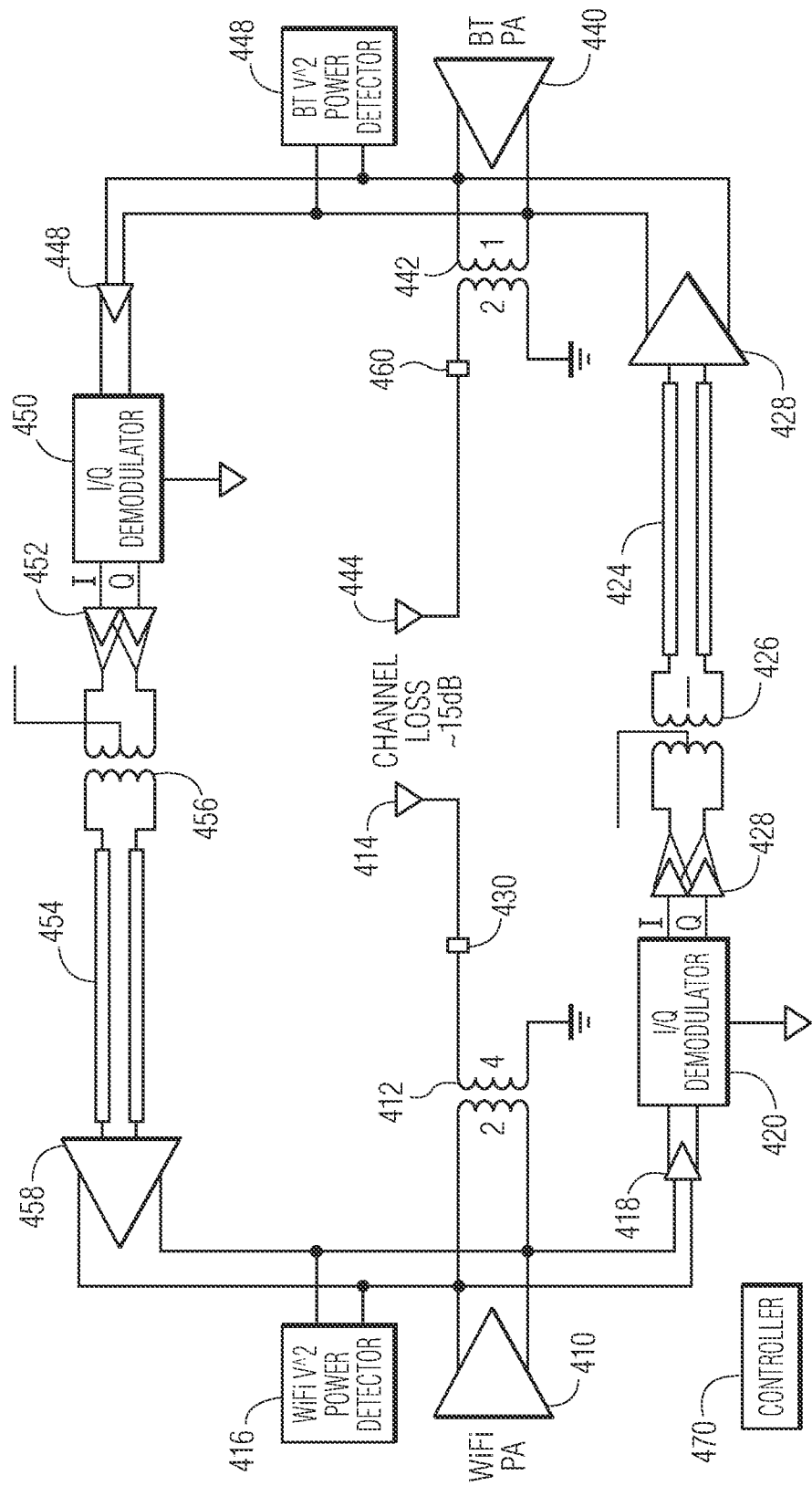
FIG. 5 illustrates another embodiment of a system including a Wi-Fi transceiver and BT transceiver that includes IMD3 cancellation.

FIG. 5 illustrates another embodiment of a system including a Wi-Fi transceiver and BT transceiver that includes IMD3 cancellation. The system 500 of FIG. 5 has the same elements as the system 400 of FIG. 4. The system 500 places the auxiliary transformer baluns right after the phase interpolators, and the routing lines connect the auxiliary transformer baluns to the IMD3 cancellation amplifiers. The system 500 has a few advantages over the system 400. In the system 400, the Wi-Fi transformer balun 412 is near the auxiliary transformer balun 456 there may be cross coupling 432 between them. Similar cross coupling 462 may happen between BT transformer balun 442 and the auxiliary transformer balun 426. In the system 500, these transformer baluns are further apart and hence the cross coupling is greatly reduced.

Figure 6:
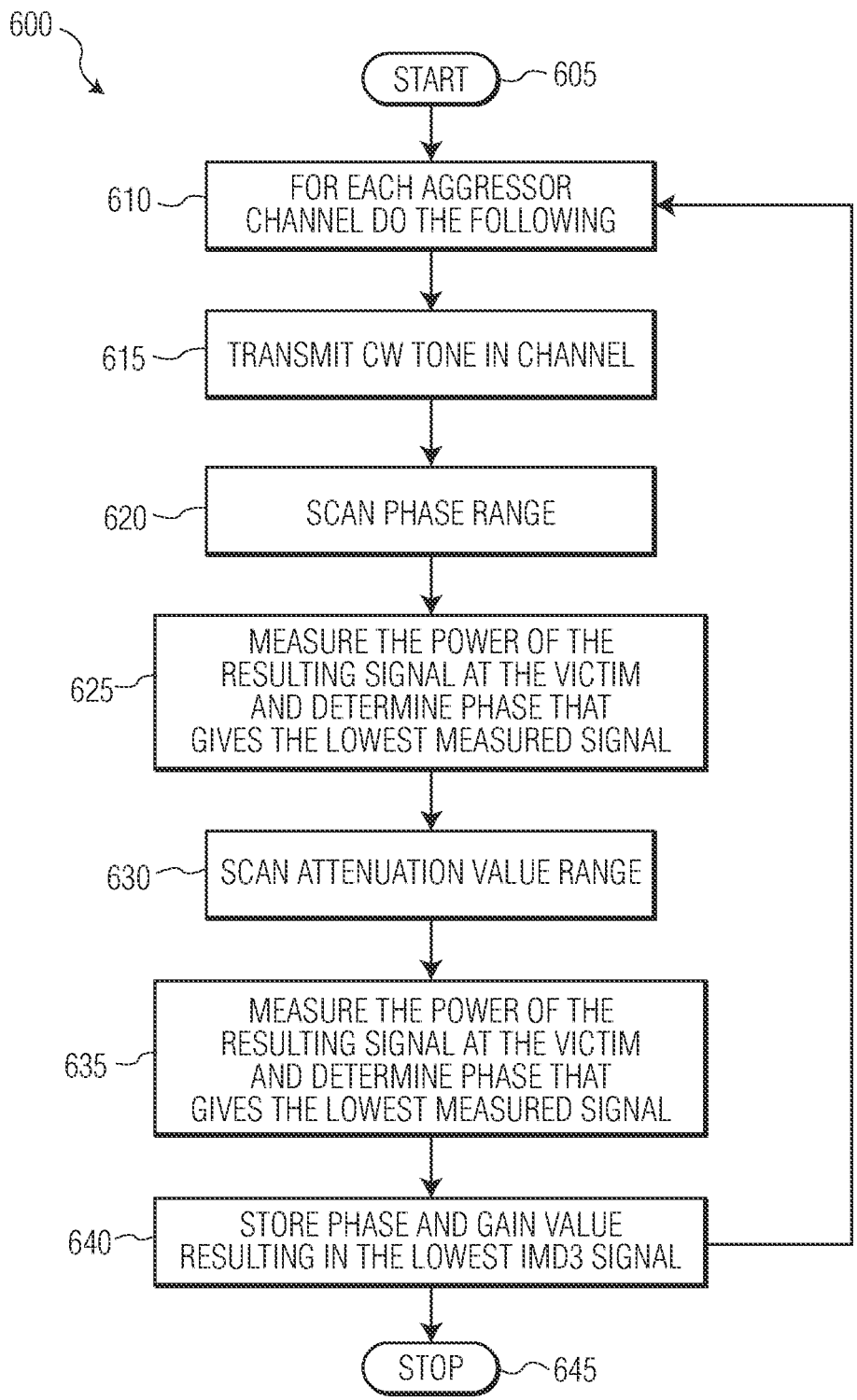

FIG. 6 is a flow chart illustrating the calibration procedure. Calibration may occur when the device including the IC is powered on. Thereafter, calibration may be repeated if needed. The controller 470 implements the calibration procedure. The calibration procedure 600 begins by selecting one of the PAs as the aggressor and the other as the victim. In this example, the Wi-Fi PA 410 will be the aggressor, and the BT PA 440 will be the victim. The calibration will be performed over a number of frequency channels that span the frequency range of the aggressor PA.

A first frequency channel of the aggressor PA is selected 610, and a CW tone is transmitted by the aggressor PA 615. The attenuator 418 is set to the coarse attenuation value based upon the coupling loss between the antennas. Next, the controller 470 selects an initial attenuation value for the I/Q phase interpolator 422. This could be any of the attenuation values available, but the lowest attenuation may be selected to allow for the greatest dynamic range in the resulting signals. The controller then scans the complete range of available phase values at a predetermined phase increment 620. For example, a phase range of 0° to 360° with 10° increments may be used. Other phase increments may be used resulting in a tradeoff between finer control of the cancellation tone at the expense of more calibration data and a longer calibration time. Each phase value is applied to the phase interpolator 422, and the resulting coupled signal is measured 625 by the BT power detector 446. The phase resulting in the lowest measured power is selected.

Next, the controller 470 scans the attenuation values 630. Again, the range of attenuation will be selected based upon the specific application. Further, the size of the increment between attenuation values is selected to balance accuracy and the time it takes to perform the calibration and the amount of calibration data to store. Each attenuation value is applied to the phase interpolator 422, and the resulting coupled signal is measured 635 by the BT power detector 446. The attenuation value resulting in the lowest measured power is selected. This is the phase and attenuation value to be used to generate a cancellation signal at selected aggressor frequency and becomes the stored calibration values used during the operation of the system 640. The process then repeats for each frequency channel. The number and increment between the frequency channels will be selected to balance of accuracy versus the time to perform the calibration and the amount of calibration data to store.

The whole process may then repeat by swapping the roles of the aggressor and victim to determine the calibration values to use to compensate for the cross coupled BT signal in the Wi-Fi system.

In an alternative embodiment, an exhaustive scanning of each phase and attenuation combination may be carried out, where each pair of values are applied to the calibration circuit and the resulting signal measured by the BT power detector 440. Then the lowest value may be determined from all of the values. This approach takes more time to perform calibration, especially if the number pairs is large, but if the effects of phase changes and attenuation on the resulting cross coupled signal are interdependent, this second approach will be more accurate. If the effects of phase and attenuation are independent of one another, then the embodiment of 600 may be used and the calibration process will be much quicker.

It is noted that the use of calibration may depend upon the type of modulation being carried out by one or both of the transceivers on the IC. In certain modes of operation, the cancellation signal may not be needed. Again, the controller 470 will control the generation of the cancellation signal.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A cancellation circuit configured to generate a cancellation signal, comprising:
    an attenuator configured to attenuate a transmitted signal from an aggressor transmitter based upon a first attenuation value;
    an I/Q demodulator configured to split an attenuated signal into in-phase (I) and quadrature signals (Q);
    a phase interpolator configured to apply a calibration phase shift and a calibration attenuation to the I signal and Q signal and to recombine the I and Q signals;
    an auxiliary balun coupled to an output of the phase interpolator; and
    an auxiliary power amplifier with an input connected to the auxiliary balun configured to generate the cancellation signal, wherein the output of the auxiliary power amplifier is connected to an output of a victim transmitter.

2. The cancellation circuit of claim 1, wherein the phase interpolator interpolates a calibration phase shift value based upon a frequency of the transmitted aggressor signal.

3. The cancellation circuit of claim 1, wherein the phase interpolator interpolates a calibration attenuation based upon a frequency of the transmitted aggressor signal.

4. The cancellation circuit of claim 1, further comprising routing lines connecting the phase interpolator to the auxiliary balun.

5. The cancellation circuit of claim 1, further comprising routing lines connecting the auxiliary balun to the auxiliary power amplifier.

6. The cancellation circuit of claim 1, further comprising a controller configured to:
scan a phase range and an attenuation range to produce phase value and attenuation value pairs;
apply each phase value and attenuation value pair to the phase interpolator;
command the aggressor transmitter to transmit a continuous wave (CW) signal; and
measure the signal power at the victim transmitter output;
determine the phase value and attenuation value pair having the lowest measured signal power,
wherein the determined phase value becomes the calibration phase value and the determined attenuation value becomes the calibration attenuation.

7. The cancellation circuit of claim 1, further comprising a controller configured to:
select an attenuation value;
scan a phase range to produce first phase value and attenuation value pairs;
apply each first phase value and attenuation value pair to the phase interpolator;
command the aggressor transmitter to transmit a continuous wave (CW) signal;
measure the signal power at the victim transmitter output;
determine the phase value having the lowest measured signal power,
scan an attenuation range to produce second phase value and attenuation value pairs using the determined phase value;
apply each second phase value and attenuation value pair to the phase interpolator;
command the aggressor transmitter to transmit a continuous wave (CW) signal;
measure the signal power at the victim transmitter output; and
determine the attenuation value having the lowest measured signal power,
wherein the determined phase value becomes the calibration phase value and the determined attenuation value becomes the calibration attenuation.

8. An integrated circuit, comprising:
a first transceiver comprising:
a first power amplifier;
a first antenna interface; and
a first balun connected to the first power amplifier and the first antenna interface;
a second transceiver comprising:
a second power amplifier;
a second antenna interface; and
a second balun connected to the second power amplifier and the second antenna interface; and
a first cancellation circuit comprising:
a first attenuator configured to attenuate a transmitted signal from the first transceiver based upon a first attenuation value;
a first I/Q demodulator configured to split a first attenuated signal into first in-phase (I) and first quadrature signals (Q);
a first phase interpolator configured to apply a first calibration phase shift and a first calibration attenuation to the first I signal and first Q signal and to recombine the first I and Q signals;
a first auxiliary balun coupled to an output of the first phase interpolator; and
a first auxiliary power amplifier with an input connected to the first auxiliary balun configured to generate a first cancellation signal, wherein the output of the first auxiliary power amplifier is connected to an output the second transceiver.

9. The integrated circuit of claim 8, further comprising a second cancellation circuit comprising:
a second attenuator configured to attenuate a transmitted signal from the second transceiver based upon a second attenuation value;
a second I/Q demodulator configured to split a second attenuated signal into second in-phase (I) and second quadrature signals (Q);
a second phase interpolator configured to apply a second calibration phase shift and a second calibration attenuation to the second I signal and second Q signal and to recombine the second I and Q signals;
a second auxiliary balun coupled to an output of the second phase interpolator;
a second auxiliary power amplifier with an input connected to the second auxiliary balun configured to generate a second cancellation signal, wherein the output of the second auxiliary power amplifier is connected to an output the first transceiver.

10. The integrated circuit of claim 8, wherein the first phase interpolator interpolates a first calibration phase shift value based upon a first frequency of the first transmitted signal.

11. The integrated circuit of claim 8, wherein the first phase interpolator interpolates a first calibration attenuation based upon a first frequency of the first transmitted signal.

12. The integrated circuit of claim 8, further comprising first routing lines connecting the first phase interpolator to the first auxiliary balun.

13. The integrated circuit of claim 8, further comprising first routing lines connecting the first auxiliary balun to the first auxiliary power amplifier.

14. The integrated circuit of claim 8, further comprising a controller configured to:
scan a first phase range and a first attenuation range to produce first phase value and attenuation value pairs;
apply each first phase value and attenuation value pair to the first phase interpolator;
command the first transceiver to transmit a first continuous wave (CW) signal;
measure the signal power at the second transceiver output; and
determine the first phase value and attenuation value pair having the lowest measured signal power,
wherein the determined phase value becomes the first calibration phase value and the determined attenuation value becomes the first calibration attenuation.

15. The integrated circuit of claim 8, further comprising a controller configured to:
select a first attenuation value;
scan a first phase range to produce first phase value and attenuation value pairs;

apply each first phase value and attenuation value pair to the first phase interpolator;
command the first transceiver to transmit a continuous wave (CW) signal;
measure the signal power at the second transceiver output;
determine the phase value having the lowest measured signal power,
scan a first attenuation range to produce second phase value and attenuation value pairs using the determined phase value;
apply each second phase value and attenuation value pair to the first phase interpolator;
command the first transceiver to transmit a continuous wave (CW) signal; and
measure the signal power at the second transceiver output;
determine the attenuation value having the lowest measured signal power,
wherein the determined phase value becomes the first calibration phase value and the determined attenuation value becomes the first calibration attenuation.

16. A method to generate a cancellation signal, comprising:
attenuating a transmitted signal from an aggressor transceiver based upon a first attenuation value;
splitting an attenuated signal into in-phase (I) and quadrature signals (Q);
applying a calibration phase shift and a calibration attenuation to the I signal and Q signal and recombining the I and Q signals;
amplifying recombined I and Q signals to generate the cancellation signal; and
applying the cancellation signal to an output of a victim transmitter.

17. The method of claim 16, further comprising interpolating a calibration phase shift value based upon a frequency of the transmitted aggressor signal.

18. The method of claim 16, further comprising interpolating a calibration attenuation based upon a frequency of the transmitted aggressor signal.

19. The method of claim 16, further comprising:
scanning a phase range and an attenuation range to produce phase value and attenuation value pairs;
applying each phase value and attenuation value pair to the I and Q signals;
commanding the aggressor transmitter to transmit a continuous wave (CW) signal;
measuring the signal power at the victim transmitter output; and
determining the phase value and attenuation value pair having the lowest measured signal power,
wherein the determined phase value becomes the calibration phase value and the determined attenuation value becomes the calibration attenuation.

20. The method of claim 16, further comprising:
selecting an attenuation value;
scanning a phase range to produce first phase value and attenuation value pairs;
applying each first phase value and attenuation value pair to I and Q signals;
commanding the aggressor transmitter to transmit a continuous wave (CW) signal;
measuring the signal power at the victim transmitter output;
determining the phase value having the lowest measured signal power,
scanning an attenuation range to produce second phase value and attenuation value pairs using the determined phase value;
applying each second phase value and attenuation value pair to I and Q signals;
commanding the aggressor transmitter to transmit a continuous wave (CW) signal;
measuring the signal power at the victim transmitter output; and
determining the attenuation value having the lowest measured signal power,
wherein the determined phase value becomes the calibration phase value and the determined attenuation value becomes the calibration attenuation.

\* \* \* \* \*